(12) United States Patent
Brachet

(10) Patent No.: US 11,867,213 B2
(45) Date of Patent: Jan. 9, 2024

(54) TEMPORARY FASTENER FOR STRUCTURES

(71) Applicant: LISI AEROSPACE, Paris (FR)

(72) Inventor: Julien Brachet, Mehun sur Yèvre (FR)

(73) Assignee: LISI AEROSPACE, Paris (FR)

( * ) Notice: Subject to any disclaimer, the term of this patent is extended or adjusted under 35 U.S.C. 154(b) by 661 days.

(21) Appl. No.: 17/045,957

(22) PCT Filed: Apr. 17, 2019

(86) PCT No.: PCT/EP2019/059895
§ 371 (c)(1),
(2) Date: Oct. 7, 2020

(87) PCT Pub. No.: WO2019/201980
PCT Pub. Date: Oct. 24, 2019

(65) Prior Publication Data
US 2021/0025424 A1 Jan. 28, 2021

(30) Foreign Application Priority Data
Apr. 17, 2018 (FR) ........................ 1853326

(51) Int. Cl.
*F16B 21/00* (2006.01)
*F16B 19/10* (2006.01)
*B25B 31/00* (2006.01)

(52) U.S. Cl.
CPC .......... *F16B 19/109* (2013.01); *B25B 31/005* (2013.01)

(58) Field of Classification Search
CPC ................................................. B25B 31/0005
(Continued)

(56) References Cited

U.S. PATENT DOCUMENTS 3,162,072 A 12/1964 Stewart
4,459,728 A * 7/1984 Gaquere ............... B25B 31/005
29/243.523

(Continued)

FOREIGN PATENT DOCUMENTS

EP 0336808 10/1989
EP 2999571 3/2016
(Continued)

OTHER PUBLICATIONS

Pirog, Pawal, International Search Report, dated Jul. 24, 2019, 3 pages, European Patent Office, Rijswijk, Netherlands.

*Primary Examiner* — Gary W Estremsky
(74) *Attorney, Agent, or Firm* — Henricks Slavin LLP

(57) ABSTRACT

The present invention concerns a fastener (110) for the temporary assembly of at least two previously drilled structures (112) comprising:
a hollow body (122) comprising a bearing surface (40);
elastic clips (24) which are movable relative to the body and which form a projection relative to the bearing surface;
a spacer (26) around which the elastic clips are positioned;
a connecting element (130), extending within the body and secured to the elastic clips (24); and
an actuating element (132) linked to connecting element by a thread/tapping (67, 84).
The connecting element is traversed by a lateral opening (70) axially extended between two closed ends (72, 74); and the fastener also comprises a transverse stop (28) secured to the spacer, the said stop being capable of sliding between the axial ends of the said lateral opening.

12 Claims, 4 Drawing Sheets

(58) Field of Classification Search
USPC .......................................................... 411/537
See application file for complete search history.

(56)     References Cited

U.S. PATENT DOCUMENTS

| | | | | |
|---|---|---|---|---|
| 4,537,542 | A * | 8/1985 | Pratt | F16B 19/109 |
| | | | | 24/607 |
| 4,548,533 | A * | 10/1985 | Pratt | F16B 19/109 |
| | | | | 24/607 |
| 4,787,274 | A * | 11/1988 | Belanger | B25B 31/005 |
| | | | | 81/59.1 |
| 5,042,787 | A * | 8/1991 | Duffaud | B21J 15/42 |
| | | | | 269/48.4 |
| 5,228,731 | A * | 7/1993 | Glass | F16B 19/109 |
| | | | | 411/79 |
| 5,240,361 | A * | 8/1993 | Armstrong | F16B 19/109 |
| | | | | 269/48.2 |
| 10,118,280 | B2 * | 11/2018 | Bigot | B25B 31/005 |
| 2004/0075206 | A1 * | 4/2004 | Starr | B21J 15/42 |
| | | | | 269/25 |
| 2006/0083599 | A1 * | 4/2006 | Hoeckelman | F16B 19/109 |
| | | | | 411/54 |
| 2013/0039716 | A1 * | 2/2013 | McClure | F16B 33/002 |
| | | | | 411/80.1 |
| 2016/0312815 | A1 * | 10/2016 | Bigot | F16B 19/109 |
| 2016/0363146 | A1 * | 12/2016 | Branyon, III | F16B 19/109 |

FOREIGN PATENT DOCUMENTS

| | | |
|---|---|---|
| FR | 2676258 | 11/1992 |
| FR | 3014969 | 6/2015 |
| WO | WO 2017/013612 | 1/2017 |

* cited by examiner

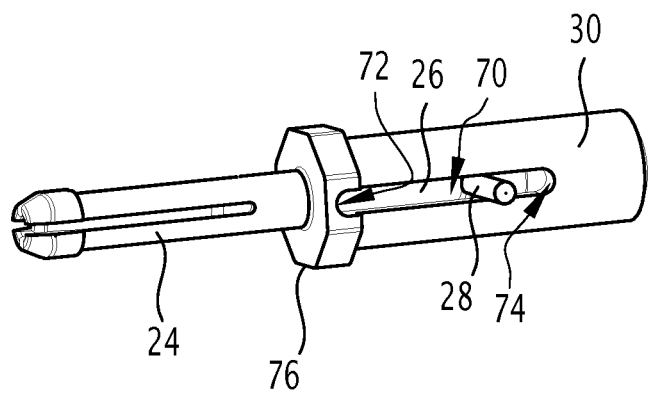
FIG.4
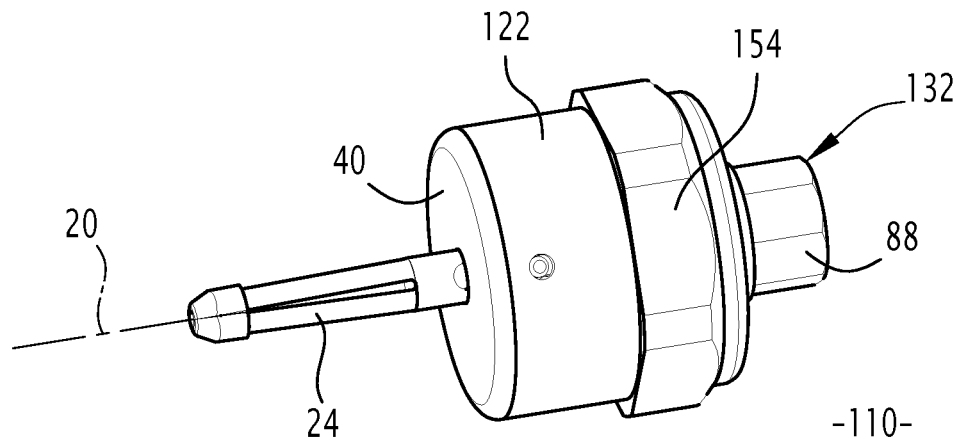
FIG.5
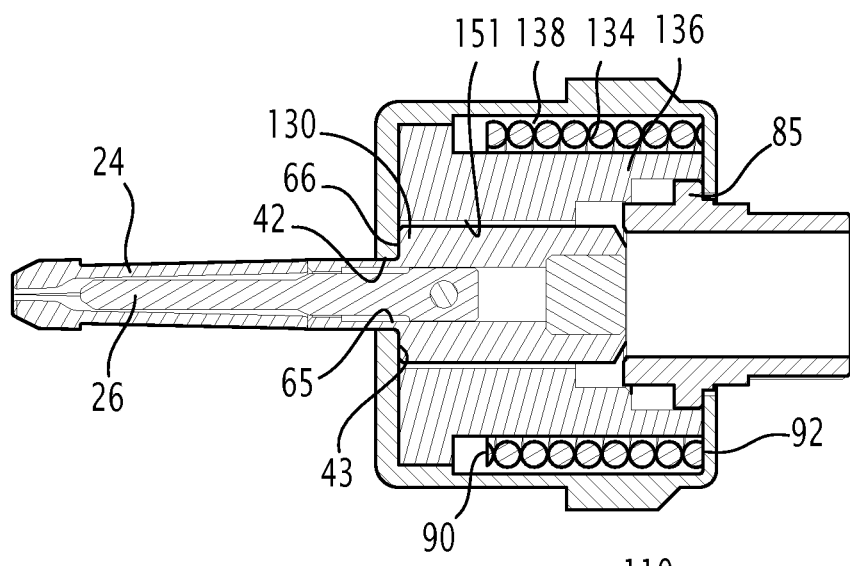
FIG.6
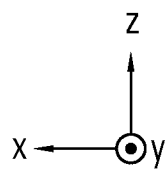

TEMPORARY FASTENER FOR STRUCTURES

CROSS REFERENCE TO RELATED APPLICATIONS

This application is a National Stage of International Application No. PCT/EP2019/059895, filed Apr. 17, 2019, which claims priority from FR 1853326 filed Apr. 17, 2018, the entire contents of which are incorporated herein by reference.

The present invention concerns a temporary fastener for the temporary assembly of at least two previously drilled structures of the type comprising: a hollow body, extending along a main axis, a first end of said body having a bearing surface substantially perpendicular to the main axis; a plurality of elastic clips movable relative to the body and extending substantially parallel to the main axis, a first end of each elastic clip comprising a hooking spur, the said hooking spurs forming a projection relative to the bearing surface of the body; a spacer extending along the main axis, a first end of the spacer forming a projection relative to the bearing surface, the plurality of elastic clips positioned around the said first end, a second end of the spacer being positioned within the body; a connecting member movable relative to the body and extending along the main axis within said body, a first end of said connecting element secured to a second end of each elastic clip; and—an actuating element connected to a second end of the connecting element by a thread/tapping type mechanism.

The invention relates particularly to temporary fasteners of the insertable clamp type.

In the aeronautical industry, before performing the final assembly of two structural elements, it is common practice to carry out a temporary assembly of the elements using temporary fasteners inserted into the through-holes. Temporary fasteners of this type are described in document EP0336808.

In similar devices, it is common practice to connect the hollow body and the elastic clips by means of an assembly part that passes between said clips. Since the function of such an assembly part is to prevent the rotation of the clips in relation to the body, its thickness increases the space between the clips, and thus limits the thickness of the clips.

Document EP0336808 refers to a temporary fastener comprising two elastic clips. It is beneficial, however, to increase the number of elastic clips so as to enlarge the gripping surface area of the structures to be assembled.

The purpose of this invention is to provide a connecting mechanism between the hollow body and the elastic clips, preserving the maximum thickness of said clips so that more than two clips can be provided for.

To this end, the object of the invention is to provide a fastener of the aforementioned type, in which the connecting element is crossed by a lateral opening substantially positioned in a transverse direction, perpendicular to the main axis, the lateral opening extending axially between the first and second closed ends; the fastener also comprises a stop extending in a transverse direction and secured to the spacer, the said stop being positioned in the lateral opening of the connecting element, allowing it to slide between the first and second axial ends of said lateral opening.

Following other advantageous aspects of the invention, the fastener comprises one or more of the following features, taken individually or according to all technically possible combinations:

the fastener also comprises a compression spring positioned within the body around the connecting element, the spring being capable of compressing along the main axis, an end of said spring being capable of entering into contact with the stop on either side of the connecting element;

the second end of the connecting element comprises a thread and the actuating element comprises a tapping co-operating with said thread;

the second end of the spacer is crossed by a through-hole positioned in a transverse direction, and the stop is a pin assembled to said through-hole;

the plurality of elastic clips includes at least three elastic clips and preferably at least four elastic clips;

the stop is secured in place along the main axis relative to the body;

the fastener also comprises a sleeve positioned within the body around the connecting element, the sleeve being secured relative to the body, a first end of said sleeve consisting of two notches extending axially and positioned opposite each other in relation to the main axis, the stop crosses the said notches and is able to slide into the notches along the main axis;

the compression spring is positioned around the sleeve;

a first end of the actuating element is positioned within the body and a second end of the actuating element forms a projection relative to a second end of said body;

the second end of the actuating element comprises a coupling element for coupling with a rotary installation tool; and the second end of the actuating element also has a collar forming an outer radial projection.

The invention also relates to an installation nose for the assembly of a fastener with at least two previously drilled structures, the said fastener being as previously described and comprising the collar, said installation nose comprising: a device to prevent rotation of the body; a rotary installation tool incorporating a means of coupling with the coupling element of the second end of the actuating element to drive the actuating member into rotation; and an elastic interlocking device on the collar to axially maintain the fastener assembled to the installation nose.

The invention further relates to an assembly comprising: structures to be assembled, including a first and a second opposite face, and a bore opening on to each of said first and second faces; and a fastener as described above, the plurality of elastic clips being positioned in the bore, the bearing face of the body and the hooking spurs coming into contact with the first and second faces respectively, the spring exerting a tension tending to move the bearing surface and the hooking spurs closer together along the main axis.

BRIEF DESCRIPTION OF THE DRAWINGS

The invention will be better understood upon reading the following description, which is provided by way of a non-limiting example, and with reference to the drawings, in which:

FIG. 4 is a perspective view of elements taken individually from the fastener in FIG. 1, in a third configuration;

FIG. 5 is a perspective view of a fastener according to a second embodiment of the invention, in a first configuration;

FIG. 6 is a cross-section view of the fastener in FIG. 5, in the first configuration;

DETAILED DESCRIPTION

Figure 9:
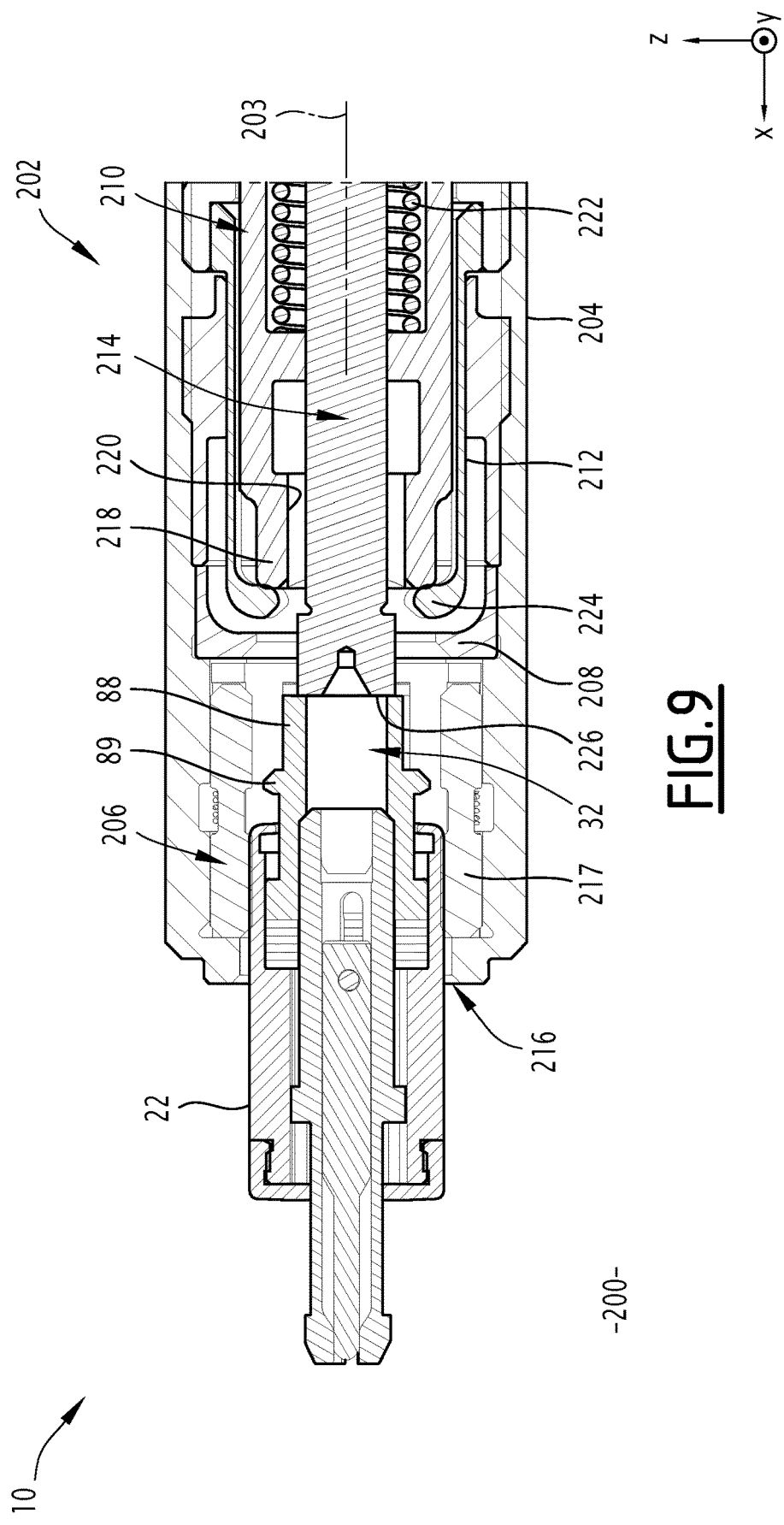
FIG. 9 is a cross-section view of an assembly comprising the fastener of FIGS. 1 to 3 and a nose installation piece according to an embodiment of the invention.

FIGS. 1-3 and 5-7 respectively show a fastener 10 according to a first embodiment of the invention and a fastener 110 according to a second embodiment of the invention. FIG. 9 shows an assembly 200 comprising fastener 10 of FIGS. 1-3 and an installation nose 202 for the installation of said fastener 10.

In the following description, fasteners 10 and 110 will be described simultaneously, the elements similar to both fasteners being identified by the same reference numbers.

Figure 3:
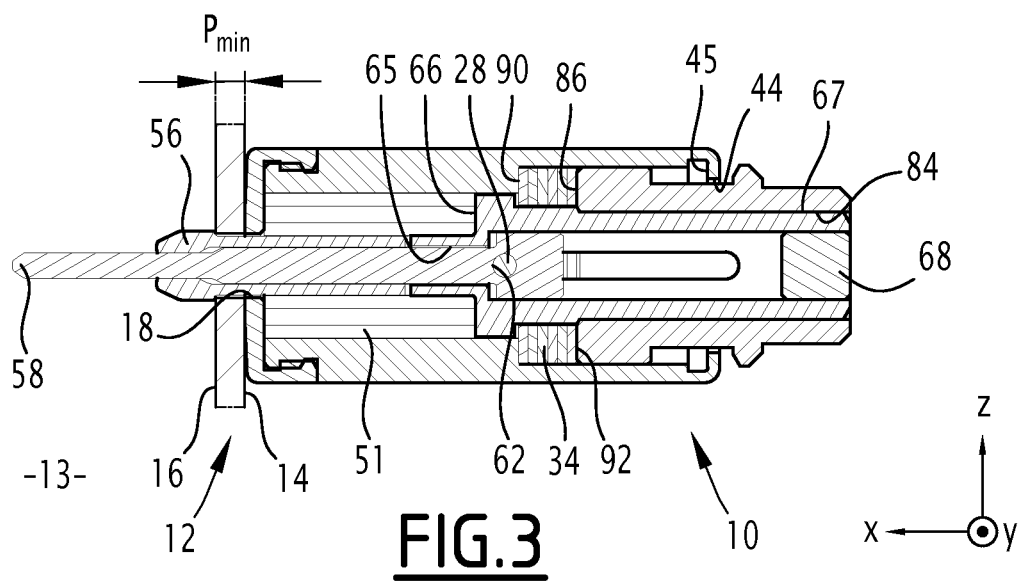
FIG. 3 is a cross-section view of an assembly comprising the fastener of FIG. 1 in a second configuration.
Figure 7:
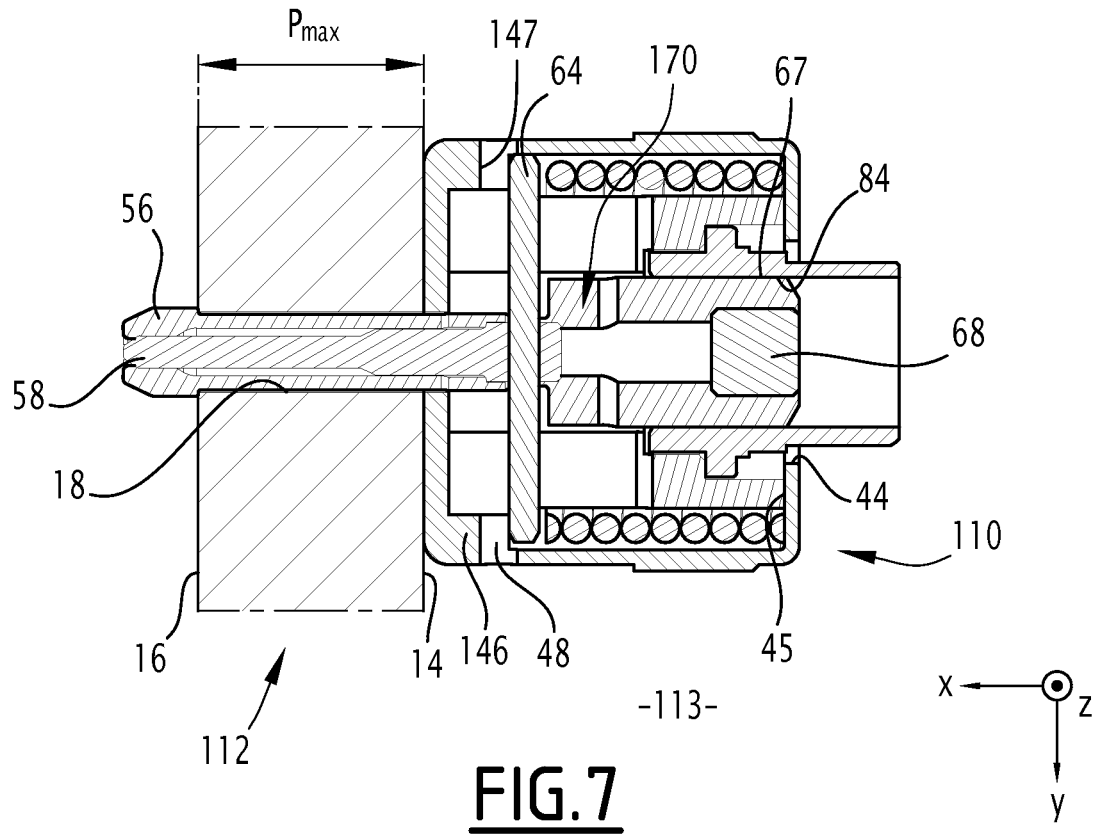
FIG. 7 is a cross-section view of an assembly comprising the fastener of FIG. 5 in a second configuration.

Fastener 10, 110 is suitable for temporary assembly on at least two structures 12, 112, shown in FIGS. 3 and 7, to form an assembly 13, 113. For the purpose of simplification, structures 12, 112 are represented in a single piece, defining two opposite faces 14, 16. A bore 18 crosses structures 12, 112 from the first face 14 to the second face 16.

As it will be specified later, structures 12 in FIG. 3 form a $P_{min}$ thickness corresponding to the minimum thickness of the structures that can be assembled by the fastener 10. In contrast, structures 112 in FIG. 7 form a $P_{max}$ thickness corresponding to the maximum thickness of the structures that can be assembled by the fastener 110. The thickness corresponds to the distance between the first face 14 and the second face 16.

The fastener 10, 110 extends along a main axis 20 and consists of: a body 22, 122; elastic clips 24; a spacer 26; a pin 28; a connecting element 30, 130; an actuating element 32, 132; and a spring 34, 134. The fastener 110 according to the second embodiment of the invention also comprises a sleeve 136.

Figure 8:
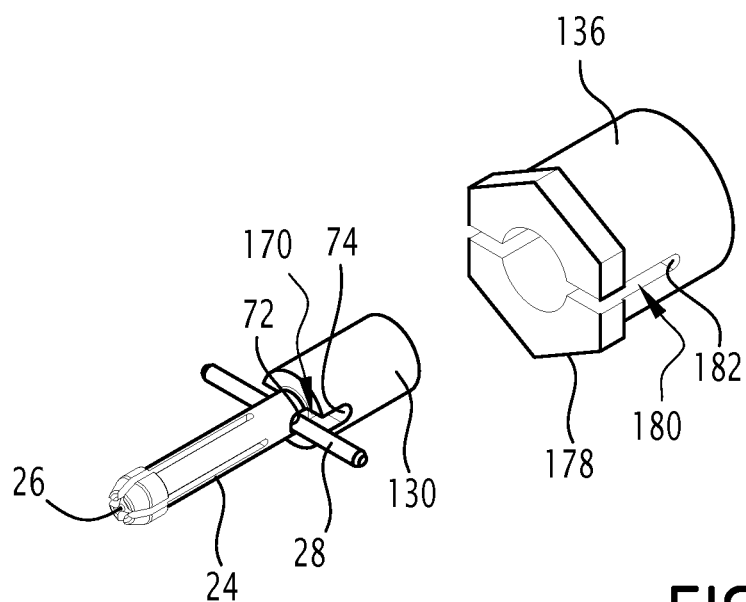
FIG. 8 is an exploded perspective view of elements taken individually from the fastener in FIG. 5, in the second configuration.

FIG. 4 shows the elastic clips 24, the spacer 26, the pin 28 and the connecting element 30 of fastener 10. FIG. 8 shows, in an exploded perspective view, the elastic clips 24, the spacer 26, the pin 28 and the connecting element 130 as well as the sleeve 136 of the fastener 110.

As will be detailed later, the second embodiment in FIGS. 5 to 8 is specially designed with compact bulk along the main axis 20.

Body 22, 122 is hollow, with an inner cavity 38, 138 of a substantially cylindrical shape. A first axial end of body 22, 122, known as the front end, includes a bearing surface 40 substantially perpendicular to the main axis 20. The said bearing surface 40 is able to come into contact with the first face 14 of structures 12, 112. The bearing surface 40 comprises a first central opening 42 communicating with the inner cavity 38, 138.

A second axial end of body 22, 122, referred to as the rear end, comprises a second central opening 44 communicating with the inner cavity 38, 138. The second central opening 44 preferably has a larger diameter than the first central opening 42.

The first 42 and second 44 central openings open onto walls 43, 45, known respectively as the front wall and the rear wall, of the inner cavity 38, 138. Each of the front 43 and rear 45 walls is substantially perpendicular to the main 20 axis.

In the second embodiment in FIGS. 5 to 8, the body 122 consists of an inner crown 146 forming an axial projection relative to the front wall 43. A rear surface 147 of said inner crown, facing towards the rear end of body 122, is capable of forming an axial stop as described below.

The body 22, 122 also comprises two lateral openings 48, of substantially circular shape. The lateral openings 48 communicate with the inner cavity 38, 138 and are located opposite each other relative to the main axis 20. The said lateral openings 48 form a transverse axis 50 perpendicular to the main axis 20. Following the description, an orthonormal basis (X, Y, Z), the longitudinal X and transversal Y directions representing the respective directions of the main axis 20 and the transverse axis 50 are considered.

Close to the front wall 43, the inner cavity 38, 138 comprises rotation preventing elements, such as flats 51, 151 parallel to the main axis 20 and positioned around said axis. In the second embodiment in FIGS. 5 to 8, flats 151 are positioned on the inner crown 146.

In the second embodiment in FIGS. 5 to 8, the body 122 of the fastener 110 is formed from one part. In the first embodiment in FIGS. 1 to 4, the body 22 of fastener 10 comprises a main part, including the rear end, and a cap 52 including the front end and the bearing surface 40. The main part and the cap 52 are secured to each other.

In the second embodiment in FIGS. 5 to 8, an external surface of the body 122 consists of rotation preventing elements, such as flats 154 parallel to the main axis 20 and positioned around said axis. The flats 154 are capable of preventing rotation of the body 122 in an installation nose (not shown) similar to the installation nose 202 in FIG. 9.

The elastic clips 24 are designed to cross the bore 18 of the structures 12, 112. The elastic clips 24 are substantially identical, with at least two of them, and ideally at least three or four of them included. In the first and second embodiments shown, there are four elastic clips 24.

The elastic clips 24 extend substantially parallel to the main axis 20 and are positioned substantially regularly around said axis.

A first end of each elastic clip 24 includes a hooking spur 56, which is able to come into contact with the second face 16 of structures 12, 112.

The elastic clips 24 pass through the first central opening 42 of the body 22, 122, with the hooking spurs 56 forming a projection relative to the bearing surface 40. As described hereafter, the elastic clips 24 are movable in axial translation relative to the body 22, 122 and are rotationally fixed relative to said body.

The spacer 26 extends along the main axis 20 and passes through the first central opening 42 of body 22, 122. As described hereafter, in the first embodiment in FIGS. 1 to 4, the spacer 26 is secured relative to body 22. On the other hand, in the second embodiment in FIGS. 5 to 8, the spacer 26 is movable in axial translation relative to body 122.

A first end 58 of the spacer 26, known as the front end, forms an axial projection relative to the bearing surface 40 of the body 22, 122, the elastic clips 24 being positioned around the said forward end 58. A second end 60 of the spacer 26 is positioned in the inner cavity 38, 138 of the body 22, 122. The said second end 60 of the spacer 26 is crossed by a transverse hole 62 positioned along the Y transversal direction.

The pin 28 extends along the transverse Y direction through the through-hole 62 of the spacer 26. In the first embodiment in FIGS. 1 to 4, the ends 64 of the pin 28 are inserted into the lateral openings 48 of the body 22, securing said pin 28 and the spacer 26 to the body 22 of the fastener 10. The pin 28 thus extends along the transverse axis 50.

In the second embodiment in FIGS. 5 to 8, however, the ends 64 of the pin 28 are positioned within the inner cavity 138 of the body 122 of fastener 110, set back from the lateral openings 48 of said body 122. As described hereafter, the spacer 26 and the pin 28 are movable in translation along X relative to the body 122, of the fastener 110 and rotationally fixed relative to said body.

The connecting element 30, 130 extends along the main axis 20 and is at least partially positioned within the inner cavity 38, 138 of the body 22, 122. A first end of the said connecting element 30, 130 is secured to a second end, opposite to the hooking spur 56, of each elastic clip 24.

The connecting element 30, 130, hereinafter referred to as the hollow rod, is of tubular shape. The first end of said hollow rod 30, 130 has an axial hole 65 around which the elastic clips 24 are positioned. The said first end of the hollow rod 30, 130 also comprises a shoulder 66 forming an axial stop with the front wall 43 of the inner cavity 38, 138, so as to maintain said shoulder 66 on the inside of the inner cavity.

A second end of said hollow rod 30, 130, facing towards the rear end of the body 22, 122, has a substantially rotationally cylindrical external surface and comprises a thread 67. In the first and second embodiments represented, the second end of said hollow rod 30, 130 is closed by a plug 68.

The hollow rod 30, 130 comprises two lateral slots 70, 170, positioned opposite each other relative to the main axis 20 and extending along X between a first 72 and a second 74 closed ends. The first 72 and second 74 ends of the lateral slots 70, 170 are facing respectively towards the thread 67 and towards the elastic clips 24.

The spacer 26 passes through the axial opening 65 of the hollow rod 30, 130, the second end 60 of the spacer being positioned inside said hollow rod. The pin 28 extends transversely through the lateral slots 70, 170, enabling them to slide along X between the first 72 and second 74 ends of said lateral slots.

In the first embodiment in FIGS. 1 to 4, the pin 28 being fastened relative to the body 22, the plurality of elastic clips 24/the hollow rod 30 of fastener 10 is thus rotationally fixed around the main axis 20 relative to said body 22.

In the first embodiment in FIGS. 1 to 4, near the first end of the hollow rod 30 of the fastener 10, an external surface of said hollow rod also comprises flats 76 co-operating with the flats 51 of the inner cavity 38. Flats 51 and 76 form an additional means of rotationally preventing the hollow rod 30 in the body 22, avoiding any torque being exerted on the rod during use of the fastener 10.

In the second embodiment in FIGS. 5 to 8, the sleeve 136 of the fastener 110 extends along the main axis 20, between the first and second open ends. The sleeve 136 is fully contained in the inside of the inner cavity 138 of the body 122 and is locked in axial translation on the inside of said inner cavity. The first and second ends of the sleeve are facing towards the front and rear ends of the body 122 respectively.

Near to the first end of the sleeve 136, an external surface of said sleeve comprises flats 178 co-operating with the flats 151 of the inner cavity 138, so as to prevent rotation of the sleeve 136 in the body 122.

The hollow rod 130 is positioned on the inside of the sleeve 136, forming a projection relative to the first end of said sleeve.

The sleeve 136 comprises two lateral notches 180, positioned opposite each other relative to the main axis 20 and extending along X. A first end of said notches 180 is open onto the first end of the sleeve 136. A second end 182 of said notches 180 is closed.

The pin 28 extends transversely through the lateral notches 180, so as to ensure sliding along X between the first and second 182 ends of said lateral notches 180. Via the intermediary of the sleeve 136, the pin 28, the spacer 26 and the set of elastic clips 24/the hollow rod 130 are thus rotationally fixed around the main axis 20 relative to the body 122 of the fastener 110.

The actuating element 32, 132, hereinafter referred to as the drive nut, is of tubular shape extending along the main axis 20. The drive nut 32, 132 passes through the second central opening 44 of the body 22, 122. A first end of said drive nut 32, 132, positioned in the inner cavity 38, 138 of the body 22, 122, comprises a tapping 84 capable of cooperating with the thread 67 of the hollow rod 30, 130. The said first end of the said drive nut 32, 132 also comprises a shoulder 85 forming an axial stop with the rear wall 45 of the inner cavity 38, 138, so as to maintain said shoulder 85 on the inside of the inner cavity.

In the first embodiment in FIGS. 1 to 4, the first end of the drive nut 32 ends on a surface 86 which is substantially flat and perpendicular to the main axis 20, known as the front face of the drive nut 32.

A second end of the drive nut 32, 132, said rear end, forms a projection on the exterior of the body 22, 122. The said rear end comprises a lateral assembly surface 88 with an installation tool such as the nose installation piece 202 in FIG. 9, which will be described later. The lateral assembly surface 88 is capable of preventing rotation of the drive nut 32, 132 relative to the said installation tool. In the example shown, the lateral assembly surface 88 forms a hexagonal shape.

In the first embodiment in FIGS. 1 to 4, the second end of the drive nut 32 also includes a collar 89, or shoulder, adjacent to the lateral assembly surface 88 and forming a radial projection relative to the said lateral assembly surface. In the example shown, the collar 89 is part of the drive nut 32. As a variation, not shown, the collar may be used as an insert piece.

The spring 34, 134 extends along the main axis 20, between a first 90 and second 92 ends. The said spring 34, 134 is entirely contained within the inner cavity 38, 138 of the body 22, 122. The spring 34, 134 is capable of being compressed along the main axis 20.

In the first embodiment in FIGS. 1 to 4, the spring 34 of the fastener 10 is formed from a stack of elastic washers positioned around the hollow rod 30. The spring 34 is axially contained between the pin 28, secured to the body 22, and the front face 86 of the drive nut 32.

In the second embodiment in FIGS. 5 to 8, the spring 134 of the fastener 110 is a helical spring, positioned around the sleeve 136. A first end 90 of the spring 134 is in contact with the ends 64 of the pin 28. The second end 92 of said spring 134 acts as an axial stop against the rear wall 45 of the inner cavity 38, 138, around the second central opening 44. The spring 134 thus exerts a force on the pin 28 along the X direction, facing towards the front end of the body 122.

The assembly 200 in FIG. 9 represents the fastener 10 of the first embodiment, assembled to an installation nose 202 as part of a method for installing said fastener. This method will be described later.

The installation nose 202 extends along an installation axis 203, as shown in FIG. 9, with the main axis 20 of the fastener 10. The installation nose 202 includes a tubular support 204. Inside the said tubular support, the said installation nose also comprises: a roller cage 206, a crown 208, a rotating wrench 210, a set of holding claws 212 and an ejector rod 214.

A first axial end of the tubular support 204, known as the front end, comprises a front opening 216. A second axial end (not shown) of the tubular support 204 is able to connect to an installation machine (not shown). The roller cage 206 is axially adjacent to the front opening 216 and comprises in particular a set of rollers 217, extending along the installation axis 203 and positioned around the said axis. The said roller cage 206, for example similar to the device described in document EP2999571, is designed to prevent rotation of the body 22 of the fastener 10, which has a rotationally cylindrical outer surface.

The crown 208 is axially adjacent to the roller cage 206, opposite the front opening 216. The crown 208 forms an inner radial projection in the tubular support 204.

The rotating wrench 210 is positioned inside the tubular support, opposite the front opening 216 relative to the crown 208. The rotating wrench 210 also has a tubular shape, positioned according to the installation axis 203.

A first axial end of the said wrench, known as the front end, comprises an assembly head 218. The said assembly head comprises an indentation of 220, which can be assembled with the lateral assembly surface 88 of the drive nut 32 of the fastener 10. A second axial end (not shown) of the said wrench is able to connect to a rotational driving device of the installation machine (not shown).

The rotating wrench 210 is axially movable relative to the tubular support 204. More precisely, the said wrench comprises a compression spring 222, which exerts an axial force on the assembly head 218, facing towards the front opening 216.

The holding claws 212 extend substantially along the installation axis 203 and are positioned around the rotating wrench 210. Preferably, there should be three or four holding claws 212.

A first axial end of each holding claw 212 forms a hook 224 in a radial projection towards the interior. The hooks 224 are positioned axially between the crown 208 and the assembly head 218 of the rotating wrench 210.

A second axial end (not shown) of each holding claw 212 is secured to the tubular support 204. The holding claws are flexible, the hooks 224 are able to radially move apart and move closer to each other.

The ejector rod 214 is positioned along the installation axis 203 within the rotating wrench 210. The ejector rod 214 comprises a front bearing surface 226, facing the front opening 216 of the tubular support 204. The ejector rod 214 is movable in axial translation relative to said tubular support.

A method for installing the fastener 10, 110 in the structures 12, 112 to form an assembly 13, 113, will now be described.

Figure 1:
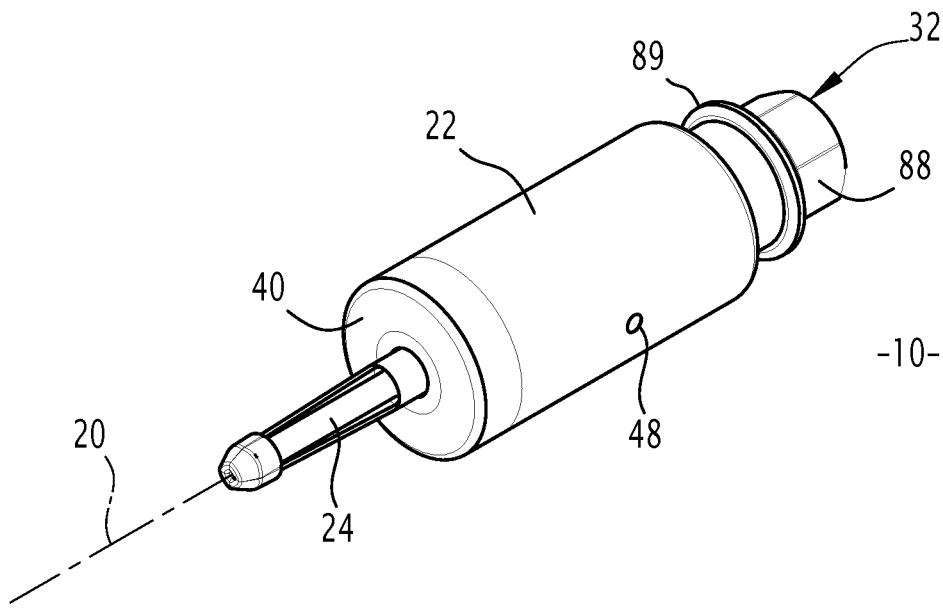
FIG. 1 is a perspective view of a fastener according to a first embodiment of the invention, in a first configuration.
Figure 2:
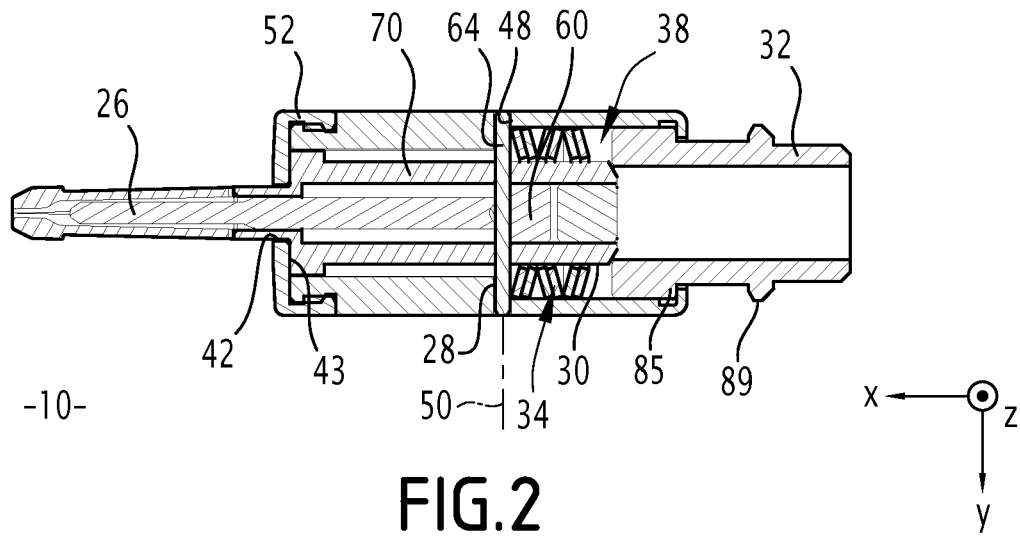
FIG. 2 is a cross-section view of the fastener in FIG. 1, in the first configuration.

At the beginning of the installation method, the fastener 10, 110 is in a first configuration, known as a free configuration, as shown respectively in FIGS. 1-2 for fastener 10 and 5-6 for fastener 110. In the free configuration, the washers forming the spring 34 of fastener 10 are not compressed. In the second embodiment in FIGS. 5 to 8, the spring 134 of the free-configuration fastener 110 is in a state of partial compression; said spring holds the pin 28 as a stop against the rear surface 147 of the inner crown 146 of the body 122.

Additionally, in the free configuration, the drive nut 32, 132 forms an axial projection of maximum length along the main axis 20, relative to the rear end of the body 22, 122. The shoulder 85 of the said drive nut forms a stop against the rear wall 45 of the inner cavity 38, 138.

In addition, in the free configuration, the shoulder 66 of the hollow rod 30, 130 forms a stop against the front wall 43 of the inner cavity 38, 138. The pin 28 is close to the second end 74 of the lateral slots 70, 170 of said hollow rod 30, 130. The elastic clips 24 form an axial projection of maximum length on the main axis 20, relative to the bearing surface 40 of body 22, 122. The forward end 58 of the spacer 26 is set back from the hooking spurs 56 of said clips. The said spurs 56 are thus in contact with each other, forming a minimum diameter perpendicular to the main axis 20.

During the first stage of the installation method, the fastener 10, 110 in free configuration is assembled to a machine (not shown) equipped with an installation tool such as the nose installation piece 202 in FIG. 9. The first phase will be described hereafter for the fastener 10 of the first embodiment:

At the beginning of the first phase of the method for installing, the ejector rod 214 of the nose installation piece 202 is in a retracted configuration, the front bearing surface 226 being rearward relative to the hooks 224 of the claws 212. The fastener 10 is inserted into the front opening 216 of the tubular support 204 of the nose installation piece, by the rear end of the drive nut 32. The axial displacement of the said drive nut 32 drives the holding claws 212 to radially separate around the lateral assembly surface 88. The said lateral assembly surface is assembled with the indentation 220 of the rotary wrench 210, until the body 22 forms an axial stop against the crown 208. The collar 89 also forms an axial stop against the assembly head 218. In addition, the hooks 224, having passed said collar 89, move closer to each other, the claws 212 elastically interlocking on the collar. The drive nut 32 is thus axially maintained between the assembly head 218 and the hooks 224. The fastener 10 can then be moved by the installation machine without falling.

During the second phase of the installation method, the fastener 10, 110 is assembled to the structures 12, 112. The second phase is described below for both installation methods:

In the first stage of the installation method, the elastic clips 24 are introduced into the bore 18 of the structures 12, 112, from the first face 14. Then, the bearing surface 40 of the body 22, 122 comes into contact with said first face 14. The hooking spurs 56 therefore form an axial projection relative to the bore 18 and the second face 16 of the structures 12, 112.

In the second stage, the body 22, 122 is rotationally fixed relative to the structures 12, 112. In the case of fastener 10, this rotational prevention is performed by the roller cage 206 of the installation nose 202.

In addition, the installation tool, coupled to the assembly surface 88 of the drive nut 32, 132, imposes on said drive nut a rotational motion around the main axis 20. In the case of the fastener 10, the rotation is imposed by the rotary wrench 210.

Under the action of said rotation motion, the cooperation of the tapping 84 of the drive nut 32, 132 with the thread 67 of the hollow rod 30, 130 drives said hollow rod and the elastic clips 24 in axial displacement towards the rear end of the body 22, 122. The pin 28 being held in a fixed position relative to the body 22, 122, said pin slides in the lateral slots 70, 170 of the hollow rod 30, 130, in the direction of the first end 72.

Similarly, the spacer 26 being held in a fixed position relative to the body 22, 122 by the pin 28, the rotation motion of the drive nut 32, 132 drives the hooking spurs 56 to move closer to the front end 58 of said spacer. When the said spurs 56 axially arrive at the level of said front end 58, the elastic clips 24 deform and the hooking spurs 56 move apart from each other.

The hooking spurs 56 thus offer a grip with the second surface 16 of the structures 12, 112, at the edge of the bore 18. This configuration of the fastener 10, 110, known as the intermediate configuration, corresponds to an assembly of structures with a $P_{max}$ thickness, as shown in FIGS. 7 and 8 for the fastener 110. FIG. 4 also shows the elastic clips 24, the spacer 26, the pin 28 and the connecting element 30 of the fastener 10 in the intermediate configuration corresponding to a $P_{max}$ thickness.

The following description relates specifically to the fastener 10 of the first embodiment in FIGS. 1 to 4. As shown in FIG. 4, in the intermediate configuration, the pin 28 of the fastener 10 is substantially the same distance from the first 72 and second 74 ends of the lateral slots 70 of the hollow rod 30.

If the structures 12 to be assembled are of a lesser thickness than the $P_{max}$, the rotation motion of the drive nut 32 is continued from the intermediate configuration. The hollow rod 30 continues to move towards the rear of the body 22 until the hooking spurs 56 come into contact with the second face 16 of the structures 12.

The configuration in FIG. 3, known as the minimum configuration, corresponds to an assembly of fastener 10 to the structures 12 of the $P_{min}$ thickness. This minimum configuration corresponds to a minimum clearance between the pin 28 and the first end 72 of the lateral slots 70 of the hollow rod 30.

Regardless of the thickness of the structures 12, after hooking the spurs 56 against the second face 16, the continuation of the rotation motion of the drive nut 32 compresses the washers 34 between the pin 28 and said drive nut 32. This compression makes it possible to apply a tension in the fastener 10, such a tension being, for example, parameterized at the installation nose 202. It is therefore necessary to maintain a clearance, even if a weak one, between the pin 28 and the first end 72 of the lateral slots 70.

The following description relates specifically to the fastener 110 of the second embodiment in FIGS. 5 to 8. As mentioned above, the fastener 110 has a short length along the main axis 20. In particular, the length of the lateral slots 170 is less than the travel of the hollow rod 130 in the body 122 between the free configuration in FIGS. 5 and 6 and the intermediate configuration in FIGS. 7 and 8. This short length of the lateral slots 170 makes it possible to use a particularly short hollow rod 130.

As a result, during the rotation of the drive nut 132 from the free configuration in FIGS. 5 and 6, the contact of the pin 28 with the first end 72 of the lateral slots 170 is substantially simultaneous to the alignment of the hooking spurs 56 with the first end 58 of the spacer 26. The spacer assembly 26/pin 28 and the set of elastic clips 24/hollow rod 130 are thus in the configuration as shown in FIG. 8.

The rotational continuation of the rod 132 jointly drives the hollow rod 130, the elastic clips 24, the pin 28 and the spacer 26 towards the rear of the body 122. The pin 28 slides in the lateral notches 180 of the sleeve 136, compressing the helical spring 134.

As shown in FIG. 7, in the intermediate configuration corresponding to the structures 112 with a $P_{max}$ thickness, the pin 28 is slightly moved away from the axial stop 147, which allows the spring 134 to apply tension in the fastener 110.

Depending on the thickness of the structures 112 to be assembled, the rotation of the drive nut 132 can be continued up to a maximum compression of the spring 134. The fastener 110 is then in the minimum configuration, corresponding to the structures of $P_{min}$ thickness. In the minimum configuration, the pin 28 is close to the second end 182 of the lateral notches 180 of the sleeve 136.

In accordance with embodiments, not shown, of the fastener, the pin 28 inserted in the transverse hole 62 of the spacer 26 is replaced by a stop secured to the spacer, said stop being capable of sliding in the lateral slots of the connecting element.

During the third phase of the installation method, the fastener 10, 110 assembled to the structures 12, 112 is separated from the installation tool. The third phase will be described hereafter for the fastener 10 of the first embodiment:

As shown in FIG. 9, the ejector rod 214 is axially thrust forward, with the front bearing surface 226 forming an axial stop against the drive nut 32. The fastener 10 is thus pushed to the exterior of the tubular support 204. Under the action of said axial thrust, the holding claws 212 move apart from each other, releasing the collar 89.

After the installation as described above of the fastener 10, 110 in the structures 12, 112, a method of disassembly of the assembly 13, 113 thus formed is performed by turning the drive nut 32, 132 in the opposite direction, so as to return the fastener 10, 110 to a free configuration. The said fastener 10, 110 can therefore be separated from the structures 12, 112 and reused.

The presence of the sleeve 136 in the fastener 110 of the second embodiment limits the total length of said fastener according to the main axis 20, without reducing the $P_{min}$-$P_{max}$ range of thicknesses for structures 112 to be assembled by the fastener 110.

In addition, in the minimum configuration of the fastener 10 of the first embodiment, the first end 58 of the spacer 26 forms a projection relative to the hooking spurs 56, as shown in FIG. 3. In the minimum configuration of the fastener 110 of the second embodiment, however, the first end 58 of the spacer 26 is aligned with the said hooking spurs 56, as in the intermediate configuration in FIGS. 7 and 8. The second installation method in FIGS. 5 to 8 thus allows an assembly 113 with a small dimension on the side of the second face 16 of the structures 112.

In the installation methods in FIGS. 1-4 and 5-8, the fastener 10, 110 can be disassembled so that any of the elements can be changed, if found to be deteriorated by previous uses. In particular, the set of elastic clips 24/hollow rod, the spacer 26, the pin 28 and possibly the cap 68 are susceptible to require changing.

A method for disassembling the fastener 10 in FIGS. 1 to 4, for example, is described below: the fastener 10 being in the free configuration of FIGS. 1 and 2, the pin 28 is removed from the rest of the fastener by pressing a sharp tool into the lateral openings 48 of the body 22. The cap 52 is then disassembled and the clips 24 and the spacer 26 are removed from the front end of the body 22.

A method for disassembling the fastener 110 in FIGS. 5-8, for example, is described below: the fastener 10 being in the free configuration of FIGS. 5 and 6, the pin 28 is removed from the body 122 as previously described. Then the drive nut 132 is rotated so as to screw the hollow rod 130 until it emerges from the second end of said drive nut. The set of elastic clips 24/hollow rod 130 is then separated from said drive nut, then the plug 68 and the spacer 26 are extracted from it by means of a tool.

The invention claimed is:

1. A fastener, for the temporary assembly of at least two previously drilled structures, said fastener comprising:
   a hollow body, extending along a main axis, a first end of said body comprising a bearing surface substantially perpendicular to said main axis;
   a plurality of elastic clips movable in relation to the body and extending substantially parallel to the main axis,
   a first end of each elastic clip comprising a hooking spur, the said hooking spurs forming a projection relative to the bearing surface of the body;
   a spacer extending along the main axis, with a first end of the said spacer forming a projection relative to the bearing surface of the body, the plurality of elastic clips being positioned around the said first end, a second end of said spacer positioned within the body;
   a connecting element movable relative to the body and extending on the main axis within the body, a first end of the connecting element being secured to a second end of each elastic clip; and
   an actuating member connected to a second end of the connecting element by a threading/tapping mechanism;
   said fastener being characterized as such that:
   the connecting element includes oppositely facing lateral openings substantially positioned in a transverse direction (Y) perpendicular to the main axis, the said lateral opening extending axially between a first and a second closed ends; and
   the fastener also comprises a stop extending along the transverse direction and secured to the spacer, said stop being positioned in the lateral opening of the connecting element, so as to slide between the first and second axial ends of said lateral opening.

2. Fastener as claimed in 1, also comprising of a compression spring positioned within the body around the connecting element, the said spring being capable of compressing on the main axis,
   one end of the said spring being able to make contact with the stop on either side of the said connecting element.

3. Fastener as claimed in claim 1, in which the second end of the connecting element comprises a thread and the actuating member comprises a tapping co-operating with said thread.

4. Fastener according to claim 1, in which the second end of the spacer is crossed by a transverse hole positioned in a transverse direction (Y), and the stop is a pin assembled to the transverse hole.

5. Fastener according to claim 1, in which the plurality of elastic clips includes at least three elastic clips and preferably at least four elastic clips.

6. Fastener according to claim 1, in which the stop is secured in translation on the main axis relative to the body.

7. Fastener according to claim 1, also including a sleeve positioned inside the body around the connecting element, the said sleeve being fixed relative to the body,
   a first end of said sleeve comprising two notches extending axially and positioned opposite each other relative to the main axis,
   the stop passing through the said notches and being capable of sliding into the said notches on the main axis.

8. Fastener as claimed in 7, further including a compression spring positioned within the body around the connecting element, the said spring being capable of compressing on the main axis, one end of the said spring being able to make contact with the stop on either side of the said connecting element in which the compression spring is positioned around the sleeve.

9. Fastener according to claim 1, in which a first end of the actuating member is positioned within the body and a second end of said actuating member forms a projection relative to a second end of the body.

10. Fastener as claimed in 9, in which the second end of the actuating member comprises a coupling element with a rotary installation tool.

11. Fastener as claimed in 10, in which the second end of the actuating member also comprises a collar forming an outer radial projection.

12. Assembly comprising:
    structures to be assembled, comprising a first and a second opposite faces, and a bore leading to each of said first and second faces; and
    a fastener according to claim 1, the plurality of elastic clips being positioned in the bore, the bearing surface of the body and the hooking spurs coming into contact respectively with the first face and the second face, the spring exerting a tension tending to bring said bearing surface and the hooking spurs together on the main axis.

* * * * *